(12) United States Patent
Czechowski et al.

(10) Patent No.: US 11,549,449 B2
(45) Date of Patent: Jan. 10, 2023

(54) THROTTLE VALVE FOR A CENTRIFUGAL COMPRESSOR

(71) Applicant: FS-Elliott Co., LLC, Export, PA (US)

(72) Inventors: Edward Czechowski, Orchard Park, NY (US); Eduardo Toledo, Pittsburgh, PA (US)

(73) Assignee: FS-ELLIOTT CO., LLC, Export, PA (US)

( * ) Notice: Subject to any disclaimer, the term of this patent is extended or adjusted under 35 U.S.C. 154(b) by 213 days.

(21) Appl. No.: 16/899,235

(22) Filed: Jun. 11, 2020

(65) Prior Publication Data

US 2021/0388780 A1    Dec. 16, 2021

(51) Int. Cl.
| | |
|---|---|
| F02D 41/00 | (2006.01) |
| F04D 27/00 | (2006.01) |
| F04D 29/44 | (2006.01) |
| F16K 1/20 | (2006.01) |
| F04D 27/02 | (2006.01) |
| F04D 29/46 | (2006.01) |
| F02B 37/12 | (2006.01) |

(52) U.S. Cl.
CPC .......... *F02D 41/0002* (2013.01); *F02B 37/12* (2013.01); *F04D 27/003* (2013.01); *F04D 27/0253* (2013.01); *F04D 29/44* (2013.01); *F04D 29/464* (2013.01); *F16K 1/2021* (2013.01); *F02D 2200/0406* (2013.01); *F05D 2260/14* (2013.01)

(58) Field of Classification Search
CPC ...... F04D 27/0253; F04D 29/464; F02D 9/08; F02D 9/10; F16K 1/16; F16K 1/18; F16K 2200/203
See application file for complete search history.

(56) References Cited

U.S. PATENT DOCUMENTS

| | | | |
|---|---|---|---|
| 1,978,127 A | 10/1934 | Downs | |
| 3,384,112 A * | 5/1968 | Smith | F16K 15/036 137/527 |

(Continued)

FOREIGN PATENT DOCUMENTS

| | | |
|---|---|---|
| DE | 3448204 | 4/1988 |
| DE | 3448204 C2 * | 4/1988 |
| JP | 2011111988 | 6/2011 |

OTHER PUBLICATIONS

PCT Application No. PCT/US2021/035728, International Search Report and Written Opinion, dated Sep. 1, 2021, 14 pgs.

*Primary Examiner* — Topaz L. Ellioitt
*Assistant Examiner* — Jackson N Gillenwaters
(74) *Attorney, Agent, or Firm* — Fletcher Yoder, P.C.

(57) ABSTRACT

A throttle valve for a centrifugal compressor includes a body having a central passage and one or more diverter flow paths. The central passage is formed by an inner surface of the body, each diverter flow path has an inlet and an outlet, and the one or more diverter flow paths are configured to induce a swirl within a fluid flow through the central passage while a portion of the fluid flow passes through the one or more diverter flow paths. The throttle valve also includes at least one blade disposed within the central passage. The at least one blade is configured to direct the portion of the fluid flow to the inlets of the one or more diverter flow paths while the at least one blade is in a partially open position.

17 Claims, 7 Drawing Sheets

(56) References Cited

U.S. PATENT DOCUMENTS

| | | | |
|---|---|---|---|
| 7,107,973 B1 * | 9/2006 | Jones | F04D 25/163 |
| | | | 417/406 |
| 2003/0047703 A1 * | 3/2003 | Patterson | F02D 9/08 |
| | | | 251/301 |
| 2012/0263586 A1 * | 10/2012 | Patil | F04D 29/462 |
| | | | 415/208.1 |
| 2016/0097351 A1 * | 4/2016 | Kiener | F02B 31/04 |
| | | | 123/568.18 |
| 2016/0131154 A1 * | 5/2016 | Yang | F04D 29/4233 |
| | | | 415/183 |

* cited by examiner

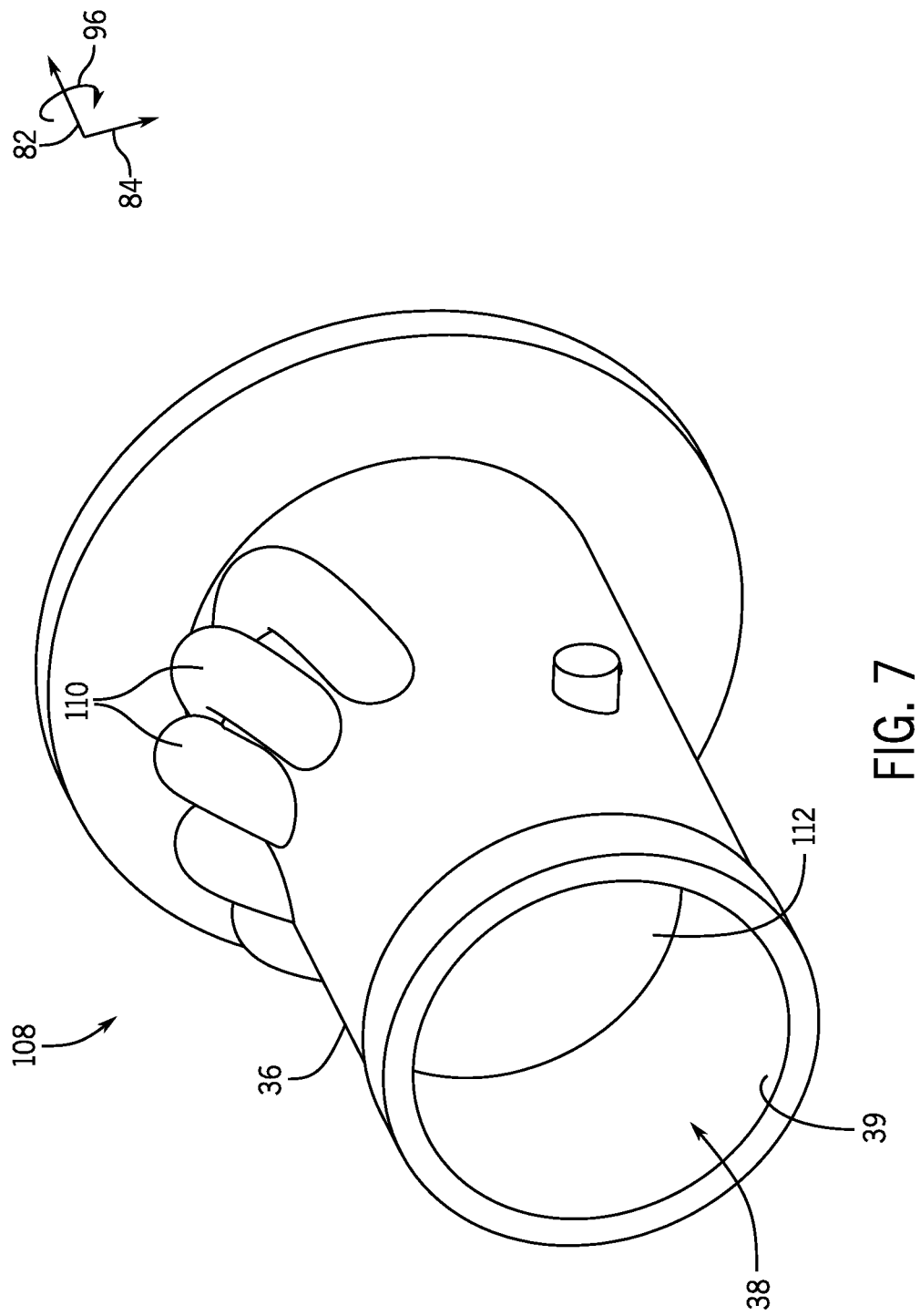

THROTTLE VALVE FOR A CENTRIFUGAL COMPRESSOR

BACKGROUND

The present disclosure relates generally to a throttle valve for a centrifugal compressor.

A throttle valve may be positioned upstream of a centrifugal compressor to control fluid flow into the impeller of the centrifugal compressor. While the throttle valve is fully open, fluid flow to the centrifugal compressor is facilitated, thereby causing the centrifugal compressor to operate at a higher capacity. In addition, while the throttle valve is partially closed, fluid flow to the centrifugal compressor is reduced, thereby causing the centrifugal compressor to operate at a lower capacity.

Certain throttle valves includes an array of radially extending vanes configured to rotate to control the fluid flow through the throttle valve. For example, while the throttle valve is fully open, a plane of each vane may be oriented substantially parallel to the fluid flow, thereby facilitating fluid flow through the throttle valve. In addition, while the throttle valve is fully closed, the plane of each vane may be oriented substantially perpendicular to the fluid flow, thereby substantially blocking fluid flow through the throttle valve. Furthermore, while the throttle valve is partially closed, the plane of each vane may be angled relative to the fluid flow, thereby reducing the fluid flow through the throttle valve. The angled vanes may also induce a swirl within the fluid flow in the same direction as the direction of rotation of the impeller of the centrifugal compressor. Accordingly, while the vanes are angled to reduce fluid flow to the centrifugal compressor, the swirling flow induced by the angled vanes may reduce the load on the centrifugal compressor, thereby reducing power consumption.

In certain throttle valves, each vane is supported by a radially extending rod that passes through the body of the throttle valve. A fluid seal and a bearing may be disposed about each rod to block fluid from flowing out of the body and to facilitate rotation of the rod/vane, respectively. Due to the large force applied to each vane by the fluid flow, the rod, the fluid seal, and the bearing may be significantly robust elements, thereby increasing the cost of the throttle valve. In addition, the linkage assembly configured to synchronize rotation of the vanes may be complex and utilize a large number of parts, thereby further increasing the cost of the throttle valve.

BRIEF DESCRIPTION

In certain embodiments, a throttle valve for a centrifugal compressor includes a body having a central passage and one or more diverter flow paths. The central passage is formed by an inner surface of the body, each diverter flow path has an inlet and an outlet, and the one or more diverter flow paths are configured to induce a swirl within a fluid flow through the central passage while a portion of the fluid flow passes through the one or more diverter flow paths. The throttle valve also includes at least one blade disposed within the central passage. The at least one blade is configured to substantially block the fluid flow though the central passage while the at least one blade is in a closed position, to enable the fluid flow through the central passage while the at least one blade is in an open position, and to direct the portion of the fluid flow to the inlets of the one or more diverter flow paths while the at least one blade is in a partially open position.

DRAWINGS

These and other features, aspects, and advantages of the present disclosure will become better understood when the following detailed description is read with reference to the accompanying drawings in which like characters represent like parts throughout the drawings, wherein:

FIG. 7 is a perspective view of another embodiment of a throttle valve that may be employed within the throttle valve assembly of FIG. 1.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
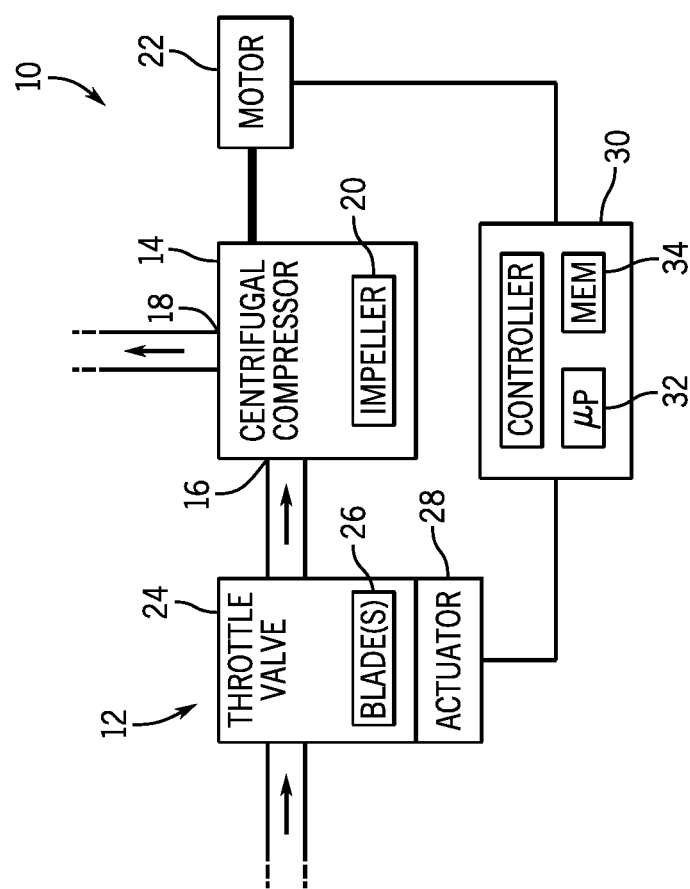
FIG. 1 is a schematic view of an embodiment of a centrifugal compressor system having a throttle valve assembly.

FIG. 1 is a schematic view of an embodiment of a centrifugal compressor system 10 having a throttle valve assembly 12. In the illustrated embodiment, the centrifugal compressor system 10 includes a centrifugal compressor 14 configured to compress fluid flowing through the centrifugal compressor. The centrifugal compressor 14 is configured to receive the fluid via an inlet 16 and to expel the fluid via an outlet 18. In addition, the centrifugal compressor 14 includes an impeller 20 coupled to a motor 22 (e.g., electric motor, hydraulic motor, etc.). The motor 22 is configured to drive the impeller 20 to rotate, thereby compressing the fluid flowing through the centrifugal compressor 14.

In the illustrated embodiment, the throttle valve assembly 12 includes a throttle valve 24 positioned upstream of the centrifugal compressor 14. The throttle valve 24 is configured to control flow of the fluid into the centrifugal compressor 14. As discussed in detail below, the throttle valve 24 includes one or more blades 26 disposed within a body of the throttle valve 24 and configured to move to control the flow of fluid through the throttle valve to the centrifugal compressor. The blades 26 are driven to move by an actuator 28 of the throttle valve assembly 12. Furthermore, in the illustrated embodiment, the centrifugal compressor system 10 includes a controller 30 communicatively coupled to the actuator 28 and to the motor 22. The controller 30 may be configured to control the actuator 28, thereby controlling the position of the blade(s) 26 of the throttle valve 24. In certain embodiments, the controller 30 may be configured to control the motor 22, thereby controlling the speed of the impeller 20. However, in other embodiments, the motor 22 may be configured to drive the impeller 20 to rotate at a substantially fixed/constant speed. In such embodiments, the controller may be communicatively coupled to a control valve configured to discharge pressure from the centrifugal compressor (e.g., when demand is reduced).

In certain embodiments, the controller 30 is an electronic controller having electrical circuitry configured to control the actuator 28 and the motor 22. In the illustrated embodiment, the controller 30 include a processor, such as the illustrated microprocessor 32, and a memory device 34. The controller 30 may also include one or more storage devices and/or other suitable components. The processor 32 may be used to execute software, such as software for controlling the actuator 28 and the motor 22, and so forth. Moreover, the processor 32 may include multiple microprocessors, one or more "general-purpose" microprocessors, one or more special-purpose microprocessors, and/or one or more application specific integrated circuits (ASICS), or some combination thereof. For example, the processor 32 may include one or more reduced instruction set (RISC) processors.

The memory device 34 may include a volatile memory, such as random access memory (RAM), and/or a nonvolatile memory, such as read-only memory (ROM). The memory device 34 may store a variety of information and may be used for various purposes. For example, the memory device 34 may store processor-executable instructions (e.g., firmware or software) for the processor 32 to execute, such as instructions for controlling the actuator 28 and the motor 22. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the actuator and the motor, etc.), and any other suitable data.

In certain embodiments, the body of the throttle valve 24 has a central passage and one or more (e.g., multiple) diverter flow paths. The central passage is formed by an inner surface of the body, and each diverter flow path has an inlet (e.g., at the inner surface) and an outlet (e.g., at the inner surface). The diverter flow paths are configured to induce a swirl within the fluid flow through the central passage while a portion of the fluid flow passes through the diverter flow paths. In addition, the blade(s) 26 of the throttle valve 24 are disposed within the central passage (e.g., such that the blade(s) are positioned upstream of the inlets of the diverter flow paths while the blade(s) are in a closed position). The blade(s) are configured to substantially block the fluid flow through the central passage while the blade(s) are in a closed position. The blade(s) are also configured to enable the fluid flow through the central passage while the blade(s) are in an open position. In addition, the blade(s) are configured to direct the portion of the fluid flow to the inlets of the diverter flow paths while the blade(s) are a partially open position.

To operate the centrifugal compressor 14 at a higher capacity, the controller may control the actuator 28 to move the blade(s) 26 to the open position, thereby facilitating fluid flow to the centrifugal compressor 14. Furthermore, to operate the centrifugal compressor 14 at a lower capacity, the controller 30 may control the actuator 28 to move the blade(s) 26 to the partially open position. With the blade(s) in the partially open position, a flow rate of the fluid through the central passage of the body of the throttle valve 24 is reduced. In addition, a portion of the fluid flow is directed to the inlets of the diverter flow paths, thereby inducing a swirl within the fluid flow through the central passage of the body. The diverter flow paths are configured to induce the swirl in the direction of rotation of the impeller 20 of the centrifugal compressor 14. As a result, the load on the centrifugal compress/motor may be reduced, thereby reducing power consumption.

In certain embodiments, a pivot rod is non-rotatably coupled to each blade. In addition, each pivot rod is pivotally coupled to opposite sides of the body of the throttle valve to enable the respective blade to rotate between the closed position, the open position, and the partially open position. A fluid seal and a bearing may be disposed between each end of each pivot rod and the body to block fluid from flowing out of the body and to facilitate rotation of the rod/blade, respectively. Because the blade is supported by two sides of the body, the bending load on the rod may be significantly less than the bending load on a rod that supports a vane via a single connection to the body (e.g., a cantilevered rod). As a result, a thinner rod may be used to support the blade, thereby reducing the cost of the throttle valve. Furthermore, because each blade is supported by two sides of the body, the load on each fluid seal and bearing may be reduced, as compared to a fluid seal/bearing disposed about a rod that supports a vane via a single connection to the body. As a result, less robust fluid seals/bearings may be utilized within the throttle valve, thereby further reducing costs. In addition, the lower loads on the fluid seals/bearings may reduce the torque sufficient to drive each blade to rotate, thereby reducing the power consumption of the actuator used to control the position of the blades and/or enabling use of a lower capacity actuator, which may further reduce the cost of the throttle valve. Furthermore, the lower loads between the rods and the body of the throttle valve may enable the body to be formed from aluminum, thereby enhancing the corrosion resistance of the body. In addition, the pressure drop through the throttle valve may be reduced, as compared to a throttle valve having vanes that are supported by a central assembly (e.g., nose cone), which is coupled to the body by supports that extend through the fluid flow.

Figure 2:
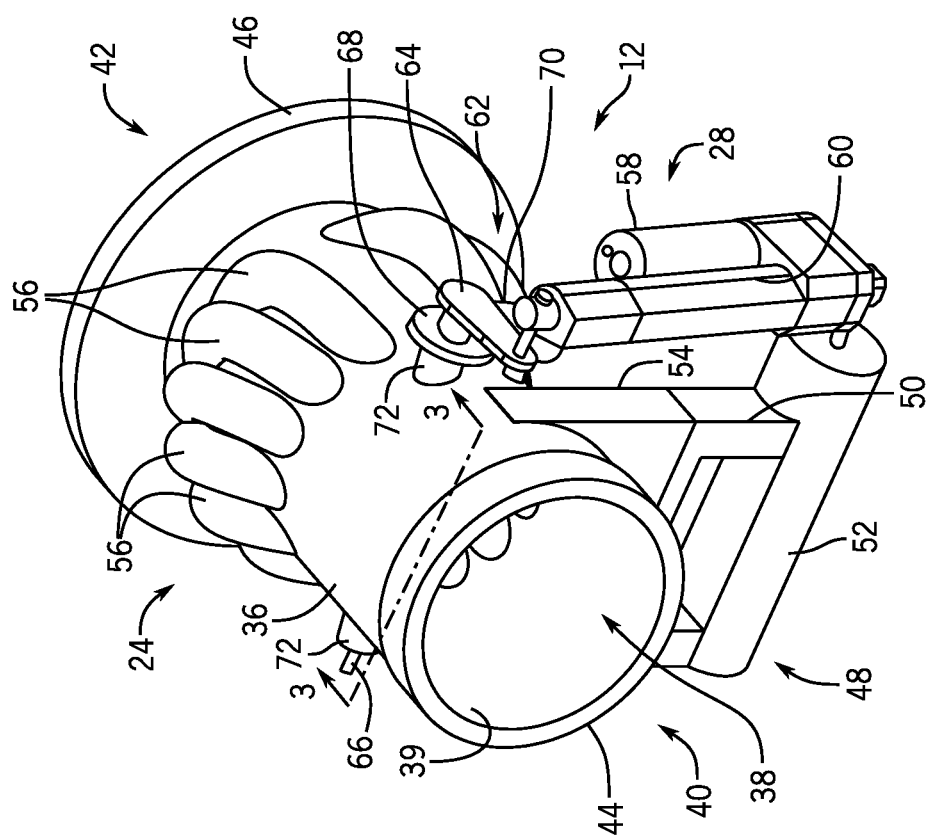
FIG. 2 is a perspective view of an embodiment of a throttle valve assembly that may be employed within the centrifugal compressor system of FIG. 1.

FIG. 2 is a perspective view of an embodiment of a throttle valve assembly 12 that may be employed within the centrifugal compressor system of FIG. 1. In the illustrated embodiment, the throttle valve 24 includes a body 36 having a central passage 38 extending between an inlet 40 and an outlet 42 of the body 36. As illustrated, the central passage 38 is formed by an inner surface 39 of the body 36. In the illustrated embodiment, the inner surface 39 of the body 36 is substantially smooth. However, in other embodiments, the body may include one or more features (e.g., guide vanes, flow disruptors, etc.) extending from the inner surface into the central passage. The central passage 38 is configured to receive fluid (e.g., air) at the inlet 40 and to expel the fluid at the outlet 42. As previously discussed, the fluid may flow from the outlet 42 to the inlet of the centrifugal compressor.

As illustrated, the body 36 has a first connecting feature 44 positioned at the inlet 40 and a second connecting feature 46 positioned at the outlet 42. Each connecting feature is configured to facilitate coupling of the body 36 to another suitable structure (e.g., a fluid conduit, the centrifugal compressor, etc.). In the illustrated embodiment, the first connecting feature 44 includes a ridge configured to engage a connector that couples the body of the throttle valve 24 to another suitable structure. In other embodiments, the first connecting feature may include a flange, a threaded portion, another suitable connecting feature, or a combination thereof (e.g., alone or in combination with the illustrated ridge). In addition, the second connecting feature 46 includes a flange configured to couple to a corresponding flange of another suitable structure (e.g., via multiple fasteners). In other embodiments, the second connecting feature may include a ridge, a threaded portion, another suitable connecting feature, or a combination thereof (e.g., alone or in combination with the illustrated flange). Furthermore, in certain embodiments, at least one of the connecting features may be omitted (e.g., in embodiments in which the body is welded to another structure, in embodiments in which the inlet of the body is not coupled to another structure, etc.).

In the illustrated embodiment, the body 36 of the throttle valve 24 is supported by a support assembly 48. As illustrated, the support assembly 48 includes a base 50 configured to couple to a support structure 52, and a cradle 54 configured to couple to the body 36. In certain embodiments, the cradle 54 may be coupled to the body 36 by a welded connection, the cradle 54 may be coupled to the base 50 by a welded connection, and the base 50 may be coupled to the support structure 52 by a welded connection. In other embodiments, at least one connection may be established by another suitable connection system (e.g., an adhesive connection, fastener(s), a press fit connection, etc.). Furthermore, while the body is supported by a single support assembly in the illustrated embodiment, in other embodiments, the body may be supported by more or fewer support assemblies (e.g., 0, 1, 2, 3, 4, or more). For example, in certain embodiments, the support assembly may be omitted, and the body may be supported by the first connecting feature and/or the second connecting feature. In addition, while the support assembly 48 includes the base 50 and the cradle 54 in the illustrated embodiment, in other embodiments, the support assembly may include other/additional suitable element(s) to support the body of the throttle valve.

In the illustrated embodiment, the body 36 of the throttle valve 24 includes multiple diverter flow paths 56. As discussed in detail below, each diverter flow path 56 has an inlet at the inner surface 39 of the body 36 and an outlet at the inner surface 39 of the body 36. The diverter flow paths 56 are configured to induce a swirl within the fluid flow through the central passage 38 while a portion of the fluid flow passes through the diverter flow paths 56. Furthermore, in the illustrated embodiment, the throttle valve 24 includes two blades disposed within the central passage 38. The two blades are configured to substantially block the fluid flow through the central passage 38 while the two blades are in a closed position. In addition, the two blades are configured to enable the fluid flow through the central passage 38 while the two blades are in an open position. The two blades are also configured to direct the portion of the fluid flow to the inlets of the diverter flow paths 56 while the two blades are in a partially open position. The diverter flow paths 56 are configured to induce the swirl in the direction of rotation of the impeller of the centrifugal compressor. As a result, while the blades are in the partially open position and the centrifugal compressor is operating at a lower capacity, the swirl induced by the diverter flow paths may reduce the load on the centrifugal compress/motor, thereby reducing power consumption.

As previously discussed, the throttle valve assembly 12 includes an actuator 28 configured to control the position of the blades of the throttle valve 24. In the illustrated embodiment, the actuator 28 includes an electric motor 58 (e.g., communicatively coupled to the controller disclosed above with reference to FIG. 1) and a rotary-to-linear converter 60. The electric motor 58 is configured to drive an input of the rotary-to-linear converter 60 to rotate, and the rotary-to-linear converter 60 is configured to convert the rotary movement of the input to a linear movement of an output. As discussed in detail below, the output of the rotary-to-linear converter 60 is configured to drive a linkage assembly 62 to rotate the two blades. The rotary-to-linear converter 60 may include any suitable device(s) configured to convert the rotary movement of the input to the linear movement of the output (e.g., a screw drive, a rack-and-pinion system, etc.). Furthermore, while the electric motor 58 is configured to drive the input of the rotary-to-linear converter 60 to rotate in the illustrated embodiment, in other embodiments, another suitable motor, such as a pneumatic motor or a hydraulic motor, may drive the rotary-to-linear converter input to rotate (e.g., alone or in combination with the electric motor). Furthermore, while the actuator includes a motor and a rotatory-to-linear converter in the illustrated embodiment, in other embodiments, the actuator may include another suitable device (e.g., alone or in combination with the motor/rotary-to-linear converter) configured to provide a linear output to the linkage assembly 62, such as a linear actuator, a hydraulic cylinder, or a pneumatic cylinder.

In the illustrated embodiment, the linkage assembly 62 includes a rotary arm 64 rotatably coupled to the output of the rotary-to-linear converter 60 and non-rotatably coupled to a first pivot rod 66. The first pivot rod 66 is non-rotatably coupled to a first blade of the two blades and rotatably supported by the body 36 of the throttle valve 24. Accordingly, movement of the output of the rotary-to-linear converter 60 drives the pivot arm 64 to rotate, thereby driving the first pivot rod 66 and the respective first blade to rotate. Furthermore, the linkage assembly 62 includes a first gear 68 non-rotatably coupled to the first pivot rod 66/pivot arm 64, and a second gear 70 non-rotatably coupled to a second pivot rod. The second pivot rod is non-rotatably coupled to a second blade of the two blades and rotatably supported by the body 36 of the throttle valve 24. In addition, the first gear 68 is engaged with the second gear 70, such that rotation of the first gear 68 drives the second gear 70 to rotate. In the illustrated embodiment, the first and second gears have the same number of teeth and substantially the same diameter. Accordingly, as the first gear 68 is driven to rotate, the angle of rotation of the second gear 70 is substantially equal to the angle of rotation of the first gear 68. As a result, as the first blade is driven to rotate by the pivot arm 64, the second blade is driven to rotate by the same amount via the first and second gears. However, in other embodiments, the first and second gears may have different numbers of teeth, such that one blade rotates less than the other blade. Because the illustrated linkage assembly 62 is only configured to control two blades having parallel rotational axes, the linkage assembly 62, including the pivot arm 64, the first gear 68, and the second gear 70, may be significantly less complex and may include significantly fewer parts than a linkage assembly configured to control multiple vanes arranged in a radial configuration within the central passage. As a result, the cost of the valve assembly and the duration associated with calibrating alignment of the vanes/blades may be significantly reduced.

While the linkage assembly includes a pivot arm in the illustrated embodiment, in other embodiments, the pivot arm may be omitted, and the output of the rotary-to-linear converter may be directly rotatably coupled to the first gear or the second gear at a point radially outward from the pivot axis of the respective gear. Furthermore, while the first and second gears are directly engaged with one another in the illustrated embodiment, in other embodiments, the first and second gears may be engaged with one another via a chain or a belt. In addition, while the linkage assembly includes the first and second gears in the illustrated embodiment, in other embodiments, the linkage assembly may include another suitable device (e.g., wheel, pulley, etc.) non-rotatably coupled to the first pivot rod and/or another suitable device (e.g., wheel, pulley, etc.) non-rotatably coupled to the second pivot rod, in which the device(s)/gear(s) are engaged with one another (e.g., directly, via a chain, via a belt, etc.). Furthermore, in certain embodiments, the rotary-to-linear converter and the pivot arm may be omitted, and an output shaft of a rotary actuator (e.g., electric motor, pneumatic motor, hydraulic motor, etc.) may be non-rotatably coupled to the first gear/device or the second gear/device. In such embodiments, the rotary actuator may drive the gear(s)/device(s) to rotate, thereby controlling the position of the blades.

In addition, in certain embodiments, each pivot rod may be independently driven to rotate by a respective actuator. For example, an output shaft of a first rotary actuator (e.g., electric motor, pneumatic motor, hydraulic motor, etc.) may be non-rotatably coupled to the first pivot rod, and an output shaft of a second rotary actuator (e.g., electric motor, pneumatic motor, hydraulic motor, etc.) may be non-rotatable coupled to the second pivot rod. The controller, which may be communicatively coupled to each rotary actuator, may control each rotary actuator (e.g., based on feedback from a respective blade position sensor) such that the respective blade is moved to a target position (e.g., such that both blades are oriented at the same angle relative to a plane that bisects the body between the blades). By way of further example, an output of a first linear actuator/rotary-to-linear converter may be coupled to the first pivot rod via a first linkage assembly, and an output of a second linear actuator/rotary-to-linear converter may be coupled to the second pivot rod via a second linkage assembly. In embodiments including rotary-to-linear converter(s), a rotary actuator may drive the rotary input of each rotary-to-linear converter. The controller, which may be communicatively coupled to each linear actuator/rotary actuator, may control each linear actuator/rotary actuator (e.g., based on feedback from a respective blade position sensor) such that the respective blade is moved to a target position (e.g., such that both blades are oriented at the same angle relative to a plane that bisects the body between the blades).

In the illustrated embodiment, the first pivot rod 66 is pivotally coupled to opposite sides of the body 36 of the throttle valve 24 to enable the first blade to rotate between the closed position, the open position, and the partially open position. In addition, the second pivot rod is pivotally coupled to opposite sides of the body 36 of the throttle valve 24 to enable the second blade to rotate between the closed position, the open position, and the partially open position.

A fluid seal and a bearing may be disposed between each end of each pivot rod and the body 36 (e.g., an extension 72 of the body 36) to block fluid from flowing out of the body and to facilitate rotation of the rod/blade, respectively. Because each blade is supported by two sides of the body, the bending load on the pivot rod may be significantly less than the bending load on a rod that supports a vane via a single connection to the body (e.g., a cantilevered rod). As a result, a thinner rod may be used to support the blade, thereby reducing the cost of the throttle valve. Furthermore, because each blade is supported by two sides of the body, the load on each fluid seal and bearing may be reduced, as compared to a fluid seal/bearing disposed about a rod that supports a vane via a single connection to the body. As a result, less robust fluid seals/bearings may be utilized within the throttle valve, thereby further reducing costs. In addition, the lower loads on the fluid seals/bearings may reduce the torque sufficient to drive each blade to rotate, thereby reducing the power consumption of the actuator and/or enabling use of a lower capacity actuator, which may further reduce the cost of the throttle valve.

Figure 3:
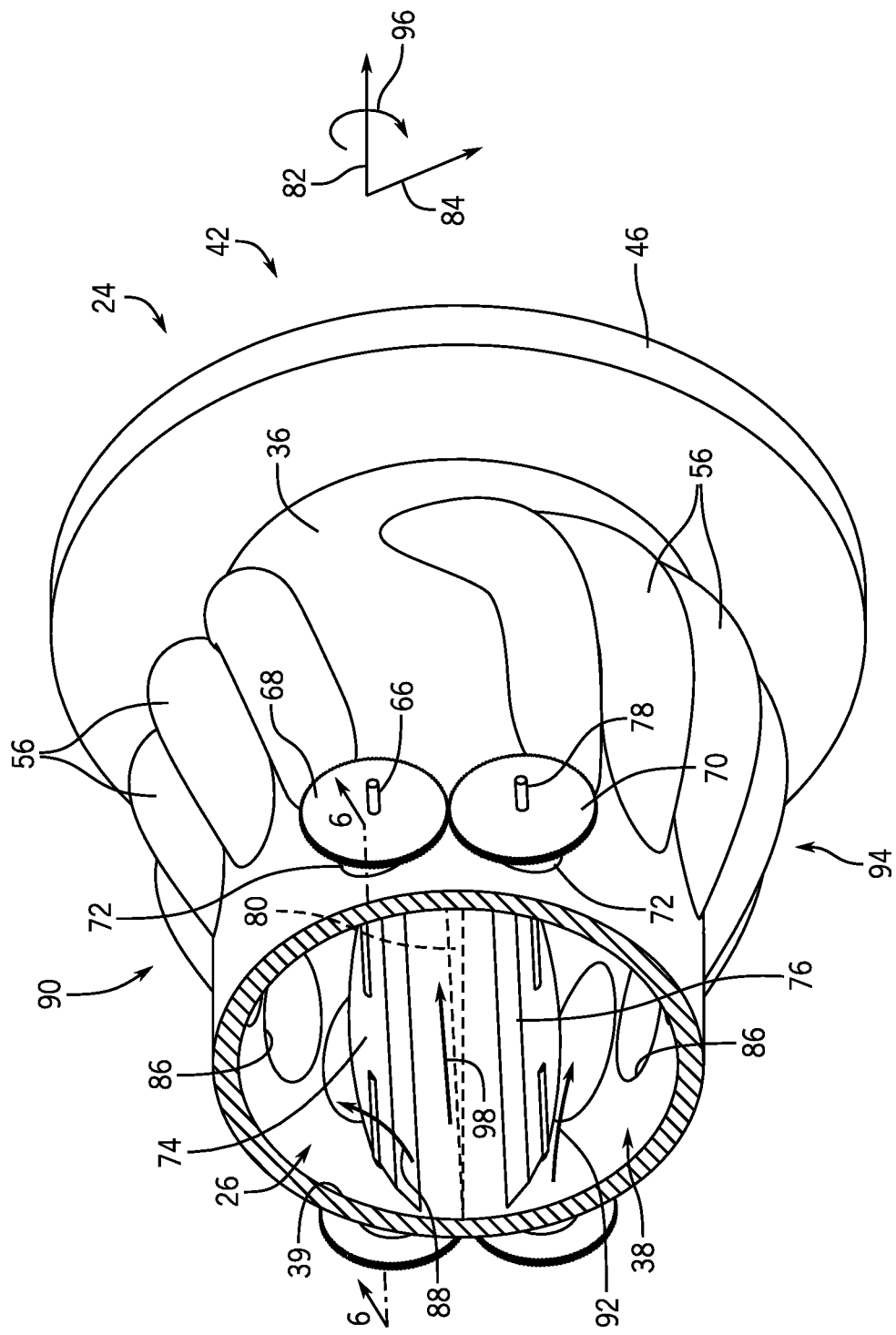
FIG. 3 is a cross-sectional view of a throttle valve of the throttle valve assembly of FIG. 2, taken along line 3-3 of FIG. 2.

FIG. 3 is a cross-sectional view of the throttle valve 24 of the throttle valve assembly of FIG. 2, taken along line 3-3 of FIG. 2. As previously discussed, the throttle valve 24 includes a first blade 74 and a second blade 76. In the illustrated embodiment, the first blade 74 is non-rotatably coupled to the first pivot rod 66, and the second blade 76 is non-rotatably coupled to the second pivot rod 78. A fluid seal and a bearing are disposed between each end of the first pivot rod 66 and the body 36 (e.g., the extension 72 of the body 36) to block fluid from flowing out of the body and to facilitate rotation of the first pivot rod 66, respectively. In addition, a fluid seal and a bearing are disposed between each end of the second pivot rod 78 and the body 36 (e.g., the extension 72 of the body 36) to block fluid from flowing out of the body and to facilitate rotation of the second pivot rod 78, respectively. Because each blade is supported by two sides of the body, the bending load on the pivot rod may be significantly less than the bending load on a rod that supports a vane via a single connection to the body (e.g., a cantilevered rod). As a result, a thinner rod may be used to support the blade, thereby reducing the cost of the throttle valve. Furthermore, because each blade is supported by two sides of the body, the load on each fluid seal and bearing may be reduced, as compared to a fluid seal/bearing disposed about a rod that supports a vane via a single connection to the body. As a result, less robust fluid seals/bearings may be utilized within the throttle valve, thereby further reducing costs. While a fluid seal and a bearing are disposed between each end of each pivot rod and the body in the illustrated embodiment, in other embodiments, at least one of the fluid seal or the bearing may be omitted from one or more pivot rod/body interfaces.

In certain embodiments, each blade and each respective pivot rod may be formed as separate elements and coupled to one another. However, in other embodiments, at least one pivot rod may be integrated with the respective blade. For example, a central portion of the pivot rod may be formed by the body of the respective blade.

The blades are configured to substantially block flow of fluid through the central passage 38 while the blades are in the closed position. While the blades are in the closed position, the plane of each blade may be orientated substantially perpendicular to the fluid flow. In addition, while the blades are in the closed position, the plane of each blade may be oriented substantially perpendicular to a plane 80 that extends along an axial axis 82 and a radial axis 84 of the throttle valve 24 and that bisects the body 36 between the blades. Furthermore, in the illustrated embodiment, while the blades are in the closed position, the blades are positioned upstream of the inlets to the diverter flow paths, thereby substantially blocking fluid flow through the diverter flow paths. In certain embodiments, with the blades in the closed position, a gap may be formed between the blades and/or between at least one blade and the inner surface 39 of the body 36. As a result, a small amount of fluid may continue to flow through the central passage 38 while the blades are in the closed position. In other embodiments, the blades (e.g., seal(s) of the blade(s)) may contact the body and/or each other to enhance the blockage of fluid through the central passage while the blades are in the closed position.

The blades are also configured to facilitate flow of the fluid through the central passage 38 while the blades are in the open position (e.g., fully open position). While the blades are in the open position, the plane of each blade may be orientated substantially parallel to the fluid flow, and the plane of each blade may be oriented substantially parallel to the plane 80. Furthermore, with the blades in the open position, a substantial portion of the fluid flow passes through the central passage. For example, less than 2 percent, less than 1 percent, less then 0.5 percent, less than 0.25 percent, or less than 0.1 percent of the fluid flow may pass through the diverter flow paths while the blades are in the open position.

In addition, the blades are configured to partially block fluid flow through the central passage 38 while the blades are in the partially open position. While the blades are in the partially open position, the plane of each blade may be orientated at an angle relative to the plane 80. Accordingly, with the blades in the illustrated partially open position, the blades direct a portion of the fluid flow to the inlets 86 of the diverter flow paths 56. As previously discussed, the diverter flow paths 56 are configured to induce a swirl within the fluid flow while the portion of the fluid flow passes through the diverter flow paths 56. In the illustrated embodiments, the first blade 74 is configured to direct a first part 88 of the portion of the fluid flow to the inlets 86 of a first group 90 of diverter flow paths 56 while the first blade 74 is in the partially open position. In addition, the second blade 76 is configured to direct a second part 92 of the portion of the fluid flow to the inlets 86 of a second group 94 of driver flow paths 56 while the second blade 76 is in the partially open position. As illustrated, the first group 90 of diverter flow paths 56 is offset from the second group 94 of diverter flow paths 56 along a circumferential axis 96 of the throttle valve 24. While the portion of the fluid flow is directed to the inlets of the diverter flow paths, a remainder 98 of the fluid flow passes between the blades, and between the blades and the body. The portion of the fluid that flows through the diverter flow paths induces the swirl within the fluid flow as the portion interacts with the remainder of the fluid at the outlets of the diverter flow paths.

In the illustrated embodiment, the angle of each blade relative to the plane 80 controls the portion of the fluid flow that enters the inlets 86 of the diverter flow paths 56. For example, while the blades are oriented at a small angle relative to the plane (e.g., while the blades are close to the open position), the portion of the fluid flow directed to the inlets of the diverter flow paths is relatively small. However, as the angle between the blades and the plane increases (e.g., as the blades move toward the closed position), the portion of the fluid flow directed to the inlets of the diverter flow paths increases. In certain embodiments, at least one blade may block the flow of fluid to an increasing portion of the respective inlets as the at least one blade approaches the closed position. Accordingly, in such embodiments, the portion of the fluid flow to the respective diverter flow paths may decrease as the at least one blade approaches the closed position.

In the illustrated embodiment, the first blade 74 and the second blade 76 are semi-circular and substantially identical to one another. However, in other embodiments, at least one blade may have another suitable shape (e.g., based on the cross-sectional shape of the central passage). For example, if the central passage has an elliptical cross-sectional shape, each blade may be semi-elliptical. Furthermore, in certain embodiments, the blades may not be substantially identical to one another. For example, one blade may have interlocking features (e.g., ridges, protrusions, etc.) configured to engage corresponding interlocking features of the other blade while the blades are in the closed position to substantially block fluid flow through the central passage. Furthermore, in the illustrated embodiment, each pivot rod extends through a centroid of the respective blade. Accordingly, each blade may pivot about the centroid, thereby reducing the torque sufficient to cause the blade to rotate between the open and closed positions. As a result, a less powerful actuator may be used to drive the blades to rotate, thereby reducing the cost of the throttle valve assembly. While each pivot rod extends through the centroid of the respective blade in the illustrated embodiment, in other embodiments, at least one pivot rod may extend through another suitable portion of the respective blade to facilitate rotation of the blade.

Furthermore, because the illustrated throttle valve utilizes two blades to control flow through the central passage, the pressure drop through the throttle valve with the blades in the open position may be reduced, as compared to a throttle valve having three or more rotatable vanes. In addition, because the swirl is induced by the diverter flow paths in the illustrated embodiment, the pressure drop through the throttle valve with the blades in the partially open position may be reduced, as compared to a throttle valve that utilized rotatable vanes to induce the swirl. While the throttle valve includes two blades in the illustrated embodiment, in other embodiments, the throttle valve may have more or fewer blades, such as the single blade configuration disclosed in detail below. For example, in certain embodiments, the throttle valve may include three or more blades (e.g., in which the blades are configured to rotate about substantially parallel axes, in which each blade is configured to direct fluid flow to a respective group of diverter flow paths while in the partially open position, etc.).

Figure 4:
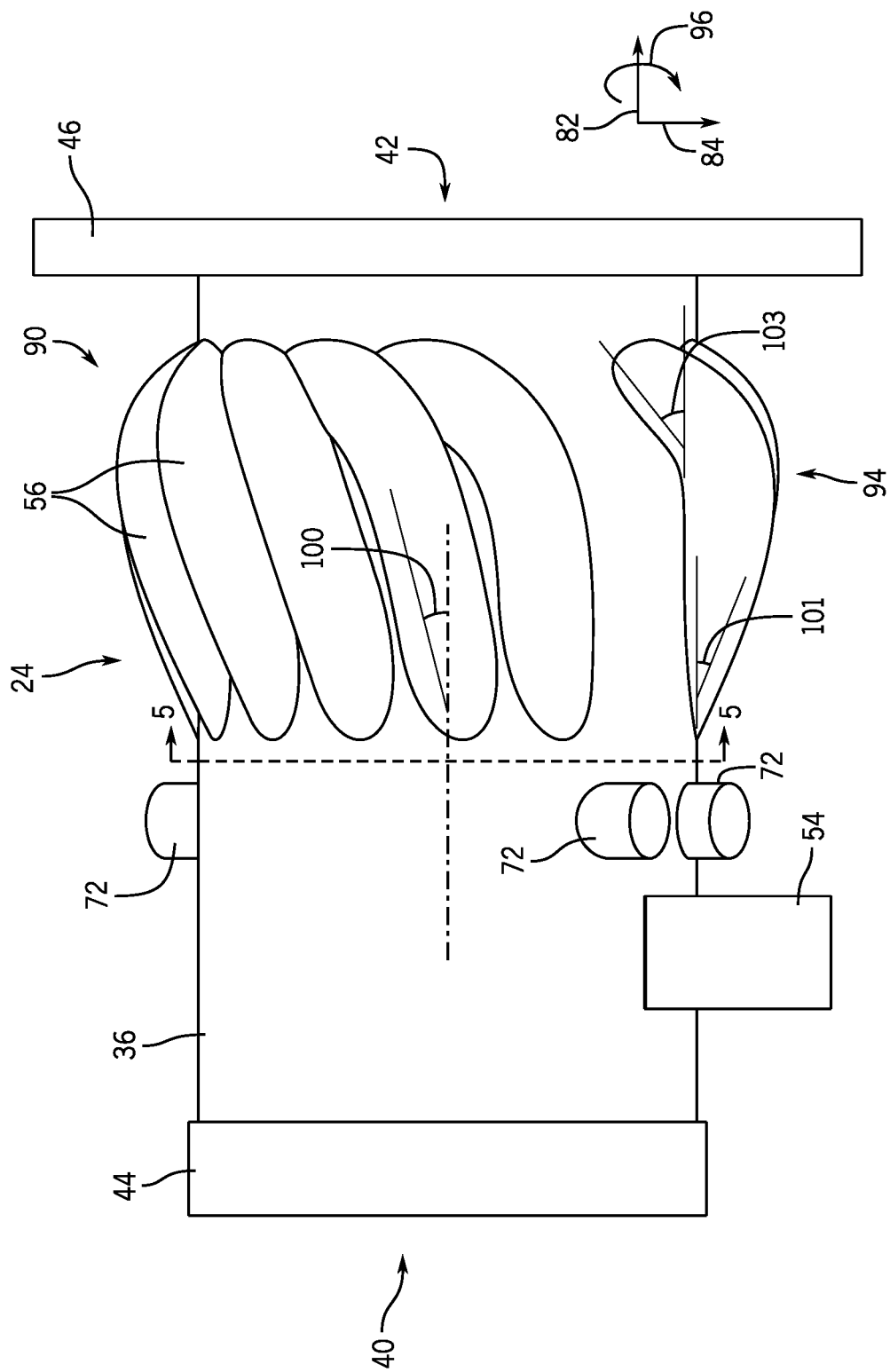
FIG. 4 is a side view of the throttle valve of FIG. 3.

FIG. 4 is a side view of the throttle valve 24 of FIG. 3. In the illustrated embodiment, the first group 90 includes six diverter flow paths 56, and the second group 94 includes six diverter flow paths 56. However, in other embodiments, each group may include more or fewer diverter flow paths. For example, in certain embodiments, the first group may include 1, 2, 3, 4, 5, 6, 7, 8, 9, 10, or more diverter flow paths, and/or the second group may include 1, 2, 3, 4, 5, 6, 7, 8, 9, 10, or more diverter flow paths. In certain embodiments, one group may be omitted. Furthermore, in certain embodiments, the first group 90 and the second group 94 have the same number of diverter flow paths, and in other embodiments, the first group may have more or fewer diverter flow paths than the second group.

As previously discussed, the diverter flow paths 56 are configured to induce a swirling flow within the fluid passing through the central passage of the throttle valve. To induce the swirl, each diverter flow path 56 is configured to receive fluid flowing generally along the axial axis 82 and to redirect the flow generally along the circumferential axis 96. Accordingly, each diverter flow path may be oriented at a small angle relative to the axial axis 82 along the circumferential axis 96 at the inlet, and each diverter flow path 56 may be oriented at a small angle relative to the circumferential axis 96 along the axial axis 82 at the outlet. For example, in certain embodiments, each diverter flow path 56, at the inlet, may be orientated at an angle 100 relative to the axial axis 82 along the circumferential axis 96 of between 0 degrees and 45 degrees, between 0 degrees and 30 degrees, between 0 degrees and 20 degrees, between 0 degrees and 15 degrees, or between 0 degrees and 10 degrees. Furthermore, in the illustrated embodiment, the angles 100 of the diverter flow paths 56 at the inlets are equal to one another. However, in other embodiments, the angle of at least one diverter flow path at the respective inlet(s) may be greater than the angle of at least one other diverter flow path at the respective inlet(s).

Furthermore, each diverter flow path 56 may be orientated at any suitable angle 101 relative to the axial axis 82 along the radial axis 84 at the inlet. For example, the angle 101 may be between 5 degrees and 60 degrees, between 10 degrees and 55 degrees, between 15 degrees and 50 degrees, or between 20 degrees and 45 degrees. In addition, each diverter flow path 56 may be orientated at any suitable angle 103 relative to the axial axis 82 along the radial axis 84 at the outlet. For example, the angle 103 may be between 5 degrees and 80 degrees, between 10 degrees and 70 degrees, between 15 degrees and 60 degrees, or between 20 degrees and 50 degrees.

Figure 5:
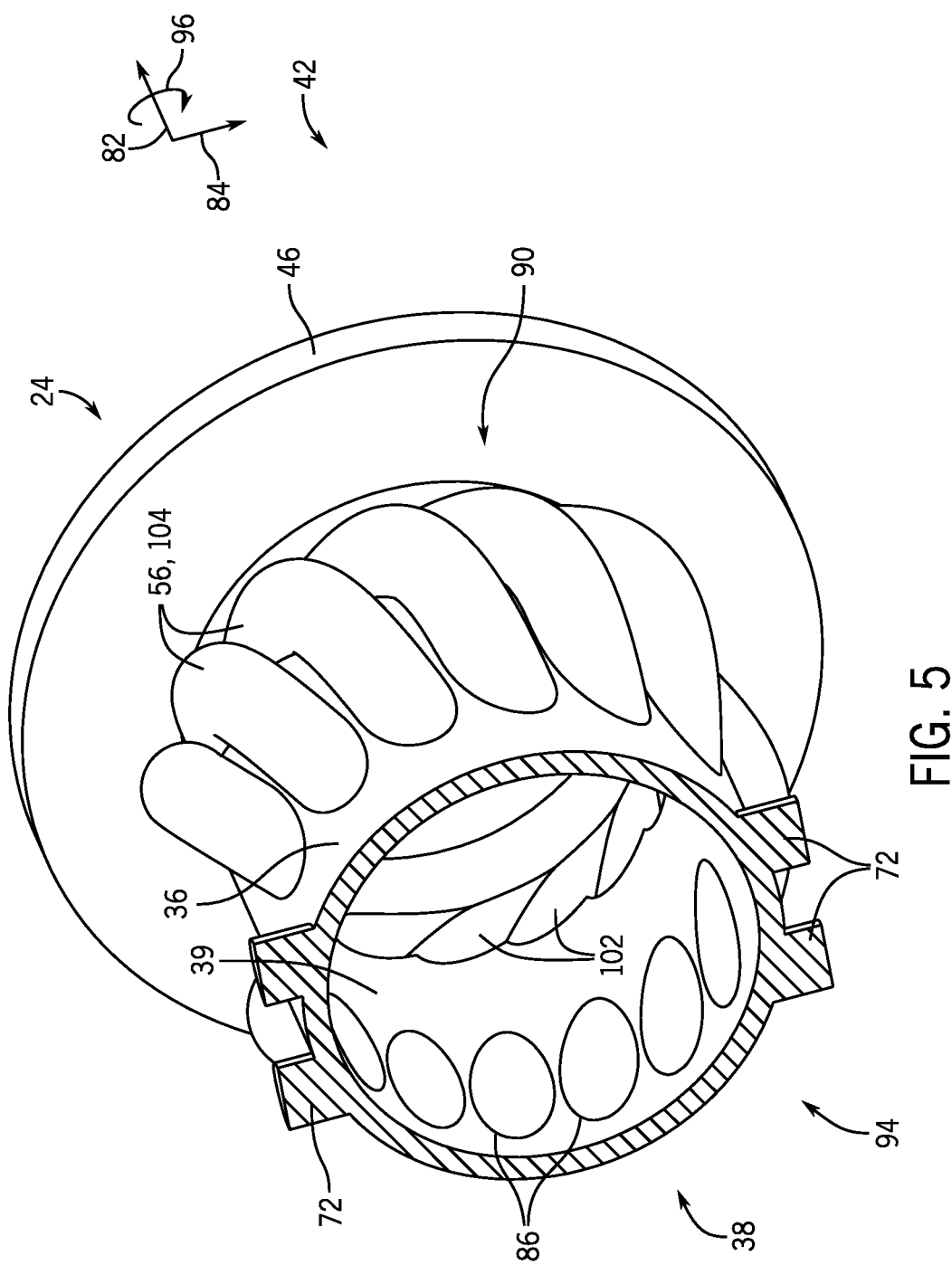
FIG. 5 is a cross-sectional view of the throttle valve of FIG. 3, taken along line 5-5 of FIG. 4.

FIG. 5 is a cross-sectional view of the throttle valve 24 of FIG. 3, taken along line 5-5 of FIG. 4. As previously discussed, each diverter flow path 56 has an inlet 86 at the inner surface 39 of the body 36 and an outlet 102 at the inner surface 39 of the body. The flow paths 56 are configured to induce a swirl within the fluid flow through the central passage 38 while a portion of the fluid flow passes through the diverter flow paths 56. In the illustrated embodiment, each diverter flow path 56 is formed by a passage 104 that extends through the body 36. Accordingly, each flow path 56 is enclosed along the passage 104 between the inlet 86 and the outlet 104, thereby directing fluid from the inlet to the outlet. However, in other embodiments, at least one diverter flow path may be formed as a channel extending along the body between the respective inlet and the respective outlet. In such embodiments, fluid may flow from the inlet to the outlet along the channel. In certain embodiments, the body is formed as a single element, including the passage(s) and/or the channel(s). For example, the body may be formed as a single element via a casting process, an additive manufacturing process, a machining process, another suitable process, or a combination thereof.

Furthermore, in certain embodiments, at least one diverter flow path may be formed by a tube that extends from the respective inlet to the respective outlet (e.g., establishing a gap between the tube and a central portion of the body). The tubes may be formed separately and coupled to a central portion of the body (e.g., via a welding process, via an adhesive connection, via fastener(s), etc.) at the respective inlets and the respective outlets, thereby forming the body. In certain embodiments, the tubes may be removable and replaceable with tubes having different properties (e.g., length, diameter, orientation, etc.), thereby facilitating reconfiguration of the throttle valve (e.g., for different expected flow rates, for different magnitudes of swirling flow, etc.). In addition, in certain embodiments, a portion of the body having the diverter flow paths may be removable and replaceable with a portion having different diverter flow paths, thereby facilitating reconfiguration of the throttle valve (e.g., for different expected flow rates, for different magnitudes of swirling flow, etc.).

In the illustrated embodiment, each diverter flow path 56 has a substantially circular cross-sectional shape along a substantial portion of the length of the diverter flow path between the respective inlet 86 and the respective outlet 102. However, in other embodiments, at least one diverter flow path may have another suitable cross-sectional shape (e.g., elliptical, polygonal, etc.) along a substantial portion of the length of the diverter flow path between the respective inlet and the respective outlet. Furthermore, in certain embodiments, the cross-sectional shape of at least one diverter flow path may vary along the length of the diverter flow path. In addition, the cross-sectional area (e.g., diameter, etc.) of each diverter flow path may be particularly selected to facilitate fluid flow between the inlet and the outlet and to induce the swirl within the fluid flow through the central passage. In certain embodiments, the cross-sectional areas of the diverter flow paths may be substantially equal to one another. However, in other embodiments, the cross-sectional area of one diverter flow path may be greater than the cross-sectional area of another diverter flow path. In addition, in certain embodiments, the cross-sectional area of at least one diverter flow path may vary along the length of the diverter flow path. For example, in certain embodiments, at least one diverter flow path may converge between the inlet and the outlet, at least one diverter flow path may diverge between the inlet and the outlet, at least one diverter flow path may have a converging-diverging section, or a combination thereof.

Furthermore, in the illustrated embodiment, the inlets 86 are aligned with one another along the axial axis 82. However, in other embodiments, at least one inlet may be positioned forward or rearward of at least one other inlet along the axial axis. In addition, in the illustrated embodiment, the outlets 102 are aligned with one another along the axial axis 82. However, in other embodiments, at least one outlet may be positioned forward or rearward of at least one other outlet along the axial axis.

Figure 6:
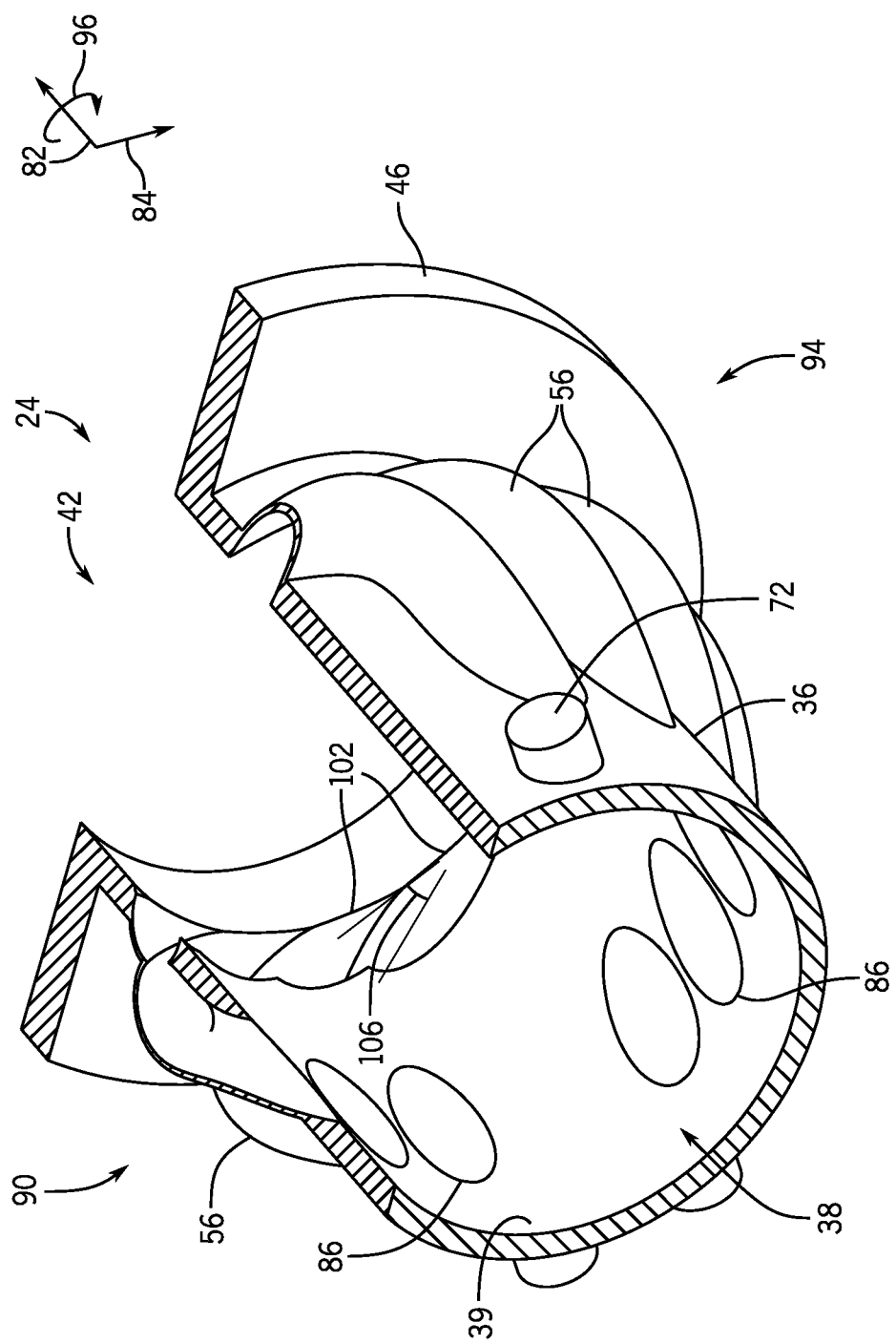
FIG. 6 is a cross-sectional view of the throttle valve of FIG. 3, taken along line 6-6 of FIG. 3.

FIG. 6 is a cross-sectional view of the throttle valve 24 of FIG. 3, taken along line 6-6 of FIG. 3. As previously discussed, each diverter flow path 56 may be oriented at a small angle relative to the circumferential axis 96 along the axial axis 82 at the outlet 102. For example, in certain embodiments, each diverter flow path 56, at the outlet, may be orientated at an angle 106 relative to the circumferential axis 96 along the axial axis 82 of between 0 degrees and 45 degrees, between 5 degrees and 40 degrees, between 5 degrees and 35 degrees, between 10 degrees and 30 degrees, or between 15 degrees and 30 degrees. Furthermore, in the illustrated embodiment, the angles 106 of the diverter flow paths 56 at the outlets 102 are equal to one another. However, in other embodiments, the angle of at least one diverter flow path at the respective outlet(s) may be greater than the angle of at least one other diverter flow path at the respective outlet(s).

In the illustrated embodiment, each inlet 86 has a substantially elliptical shape. However, in other embodiments, at least one inlet may have another suitable shape (e.g., circular, polygonal, etc.). In addition, each outlet 102 may have any suitable shape. Furthermore, in the illustrated embodiment, the inlets 86 are spaced apart from one another. However, in other embodiments, at least two inlets may be in contact with/engage one another. In the illustrated embodiment, the outlets 102 of the diverter flow paths 56 of the first group 90 are in contact with/engage one another, and the outlets 102 of the diverter flow paths 56 of the second group 94 are in contact with/engage one another. However, in other embodiments, the outlets of at least two diverter flow paths of the first group may be spaced apart from one another, the outlets of at least two diverter flow paths of the second group may be spaced apart from one another, the outlet of a diverter flow path of the first group may be in contact with/engage the outlet of a diverter flow path of the second group, or a combination thereof. Furthermore, in the illustrated embodiment, each inlet 86 and each outlet 102 is formed at the inner surface 39 of the body 36. However, in other embodiments, at least one inlet and/or at least one outlet may be formed within an extension (e.g., tube, etc.) that extends into the central passage of the body.

FIG. 7 is a perspective view of another embodiment of a throttle valve 108 that may be employed within the throttle valve assembly of FIG. 1. Similar to the embodiment disclosed above with reference to FIGS. 2-6, the throttle valve 108 includes a body 36 having a central passage 38 and multiple diverter flow paths 110. The central passage 38 is formed by an inner surface 39 of the body 36, and each diverter flow path 110 has an inlet (e.g., at the inner surface 39) and an outlet (e.g., at the inner surface 39). The diverter flow paths 110 are configured to induce a swirl within a fluid flow through the central passage 38 while a portion of the fluid flow passes through the diverter flow paths 110. Furthermore, in the illustrated embodiment, the throttle valve 108 includes a single blade 112 disposed within the central passage 38. The single blade 112 is configured to substantially block the fluid flow through the central passage 38 while the single blade 112 is in a closed position. In addition, the single blade 112 is configured to enable the fluid flow through the central passage 38 while the single blade 112 is in an open position. The single blade 112 is also configured to direct the portion of the fluid flow to the inlets of the diverter flow paths 110 while the single blade 112 is in a partially open position. In the illustrated embodiment, while the single blade 112 is in the illustrated closed position, the single blade 112 is positioned upstream of the inlets of the diverter flow paths, thereby substantially blocking fluid flow through the diverter flow paths. While the throttle valve 108 includes multiple diverter flow paths 110 in the illustrated embodiment, in other embodiments, the throttle valve may include a single diverter flow path.

In the illustrated embodiment, the single blade 112 has a circular shape corresponding to the circular cross-section of the central passage 38. However, in other embodiments, the single blade may have another suitable shape (e.g., corresponding to the shape of the central passage cross-sectional shape). Furthermore, in certain embodiments, the throttle valve 108 includes a single pivot rod coupled to the single blade 112 (e.g., at the centroid of the single blade 112), in which the single pivot rod extends through opposite sides of the body 36. The single pivot rod enables the single blade 112 to rotate between the closed position, the open position, and the partially open position. Because the single blade 112 is supported by two sides of the body 36, the bending load on the pivot rod may be significantly less than the bending load on a rod that supports a vane via a single connection to the body (e.g., a cantilevered rod). In addition, because the throttle valve includes a single blade, a less complex linkage assembly may be utilized to move the blade (e.g., as compared to a throttle valve having multiple moveable vanes). For example, a linkage assembly similar to the linkage assembly disclosed above with reference to FIG. 2, but having a single gear for the single pivot rod, may be utilized to rotate the single blade. Furthermore, in certain embodiments, the linkage assembly may be omitted, and the single blade may be driven to rotate by a single rotary actuator (e.g., electric motor, hydraulic motor, pneumatic motor, etc.) coupled to the single pivot rod.

In certain embodiments, the inlets of the diverter flow paths 110 may be positioned along a semi-circular region of the inner surface 39, and the outlets of the diverter flow paths may be distributed along the circumferential axis 96 about an entire periphery (e.g., circumference) of the inner surface. Accordingly, with the single blade 112 in the partially open position, the portion of the fluid flow (e.g., air flow) may be directed to the inlets of the diverter flow paths, and the diverter flow paths may direct the portion of the fluid flow to induce a swirl within the fluid flow through the central passage. In other embodiments, one or more inlets may be located at other suitable position(s) along the periphery of the inner surface, and/or one or more outlets may be located at other suitable position(s) along the periphery of the inner surface (e.g., the outlets may be positioned at a semi-circular region of the inner surface). Any of the properties, features, and variations disclosed above with reference to the embodiment of FIGS. 2-6 may apply to the illustrated embodiment. For example, any of the variations disclosed above with reference to the diverter flow paths, the method of manufacturing the throttle valve, and the linkage assembly used to drive the blade(s) to rotate may apply to the illustrated throttle valve.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A throttle valve for a centrifugal compressor, comprising:
   a body having a central passage and one or more diverter flow paths, wherein the central passage is formed by an inner surface of the body, each diverter flow path of the one or more diverter flow paths has an inlet and an outlet, and the one or more diverter flow paths are configured to induce a swirl within a fluid flow through the central passage while a portion of the fluid flow passes through the one or more diverter flow paths; and
   at least one blade disposed within the central passage, wherein the at least one blade is positioned upstream of the inlets of the one or more diverter flow paths while the at least one blade is in a closed position;
   wherein the at least one blade is configured to substantially block the fluid flow through the central passage while the at least one blade is in the closed position, to enable the fluid flow through the central passage while the at least one blade is in an open position, and to direct the portion of the fluid flow to the inlets of the one or more diverter flow paths while the at least one blade is in a partially open position.

2. The throttle valve of claim 1, wherein the one or more diverter flow paths comprise a plurality of diverter flow paths, the at least one blade comprises a first blade and a second blade, the first blade is configured to direct a first part of the portion of the fluid flow to the inlets of a first group of one or more diverter flow paths of the plurality of diverter flow paths while the first blade is in the partially open position, and the second blade is configured to direct a second part of the portion of the fluid flow to the inlets of a second group of one or more diverter flow paths of the plurality of diverter flow paths while the second blade is in the partially open position.

3. The throttle valve of claim 2, wherein the first blade and the second blade are semi-circular and identical to one another.

4. The throttle valve of claim 1, comprising one or more pivot rods, wherein each pivot rod of the one or more pivot rods is coupled to a respective blade of the at least one blade, and each pivot rod of the one or more pivot rods extends through opposite sides of the body.

5. The throttle valve of claim 4, wherein each pivot rod of the one or more pivot rods extends through a centroid of the respective blade.

6. The throttle valve of claim 1, wherein the inlet of at least one diverter flow path of the one or more diverter flow paths is positioned at the inner surface, the outlet of at least one diverter flow path of the one or more diverter flow paths is positioned at the inner surface, or a combination thereof.

7. The throttle valve of claim 1, wherein the body is formed as a single element by a casting process or an additive manufacturing process.

8. The throttle valve of claim 1, wherein at least one of the one or more diverter flow paths comprises a passage extending through the body.

9. The throttle valve of claim 8, wherein the passage has a substantially circular cross-section.

10. The throttle valve of claim 9, wherein the inlets of the one or more diverter flow paths are positioned along a semi-circular region of the inner surface.

11. The throttle valve of claim 1, wherein the at least one blade comprises a single blade.

12. A throttle valve for a centrifugal compressor, comprising:

a body having a central passage and a plurality of diverter flow paths, wherein the plurality of diverter flow paths is configured to induce a swirl within a fluid flow through the central passage while a portion of the fluid flow passes through the plurality of diverter flow paths;

at least one blade disposed within the central passage, wherein the at least one blade is positioned upstream of inlets of the plurality of diverter flow paths while the at least one blade is in a closed position, and wherein the at least one blade is configured to substantially block the fluid flow through the central passage while the at least one blade is in the closed position, to enable the fluid flow through the central passage while the at least one blade is in an open position, and to direct the portion of the fluid flow to the plurality of diverter flow paths while the at least one blade is in a partially open position; and one or more pivot rods, wherein each pivot rod of the one or more pivot rods is non-rotatably coupled to a respective blade of the at least one blade, and each pivot rod of the one or more pivot rods is pivotally coupled to opposite sides of the body to enable the respective blade to rotate between the closed position, the open position, and the partially open position.

13. The throttle valve of claim 12, wherein the at least one blade comprises a first blade and a second blade, the first blade is configured to direct a first part of the portion of the fluid flow to a first group of one or more diverter flow paths of the plurality of diverter flow paths while the first blade is in the partially open position, and the second blade is configured to direct a second part of the portion of the fluid flow to a second group of one or more diverter flow paths of the plurality of diverter flow paths while the second blade is in the partially open position.

14. The throttle valve of claim 12, wherein the at least one blade comprises a single blade.

15. The throttle valve of claim 12, wherein the body is formed as a single element.

16. The throttle valve of claim 12, wherein at least one of the plurality of diverter flow paths comprises a passage extending through the body.

17. The throttle valve of claim 12, wherein each pivot rod of the one or more pivot rods extends through a centroid of the respective blade.

* * * * *